United States Patent
Lu et al.

(10) Patent No.: US 11,692,919 B2
(45) Date of Patent: Jul. 4, 2023

(54) RECIPROCATING ROCK FRACTURE FRICTION-SEEPAGE CHARACTERISTIC TEST DEVICE AND METHOD

(71) Applicants: Chongqing Institute of Geology and Mineral Resources, Chongqing (CN); Chongqing University, Chongqing (CN)

(72) Inventors: Zhaohui Lu, Chongqing (CN); Yunzhong Jia, Chongqing (CN); Jiren Tang, Chongqing (CN); Yugang Cheng, Chongqing (CN); Junping Zhou, Chongqing (CN); Lei Zhou, Chongqing (CN); Pei He, Chongqing (CN)

(73) Assignees: CHONGQING INSTITUTE OF GEOLOGY AND MINERAL RESOURCES, Chongqing (CN); CHONGQING UNIVERSITY, Chongqing (CN)

( * ) Notice: Subject to any disclaimer, the term of this patent is extended or adjusted under 35 U.S.C. 154(b) by 291 days.

(21) Appl. No.: 17/196,017

(22) Filed: Mar. 9, 2021

(65) Prior Publication Data
US 2021/0285858 A1 Sep. 16, 2021

(30) Foreign Application Priority Data
Mar. 9, 2020 (CN) .......................... 202010155263.5

(51) Int. Cl.
G01N 19/02 (2006.01)
G01N 3/36 (2006.01)
G01N 15/08 (2006.01)

(52) U.S. Cl.
CPC ............... G01N 3/36 (2013.01); G01N 19/02 (2013.01); *G01N 2203/0005* (2013.01);
(Continued)

(58) Field of Classification Search
CPC .. G01N 3/36; G01N 19/02; G01N 2203/0005; G01N 2203/0025;
(Continued)

(56) References Cited

U.S. PATENT DOCUMENTS

| 8,656,788 | B2 * | 2/2014 | Jeong | G01N 3/24 |
| | | | | 73/862.581 |
| 10,197,483 | B2 * | 2/2019 | Du | G01N 3/10 |
| 2019/0011344 | A1 * | 1/2019 | Zhou | G01N 3/24 |

* cited by examiner

*Primary Examiner* — Brandi N Hopkins
(74) *Attorney, Agent, or Firm* — Hauptman Ham, LLP

(57) ABSTRACT

The present disclosure discloses a reciprocating rock fracture friction-seepage characteristic test device and method. The test device includes an X-axis shear system, a Y-axis stress loading system, a Z-axis stress loading system, a servo oil source system, 5 a pore pressure loading system, and a host. The X-axis shear system includes an X-axis EDC controller, an upper shear box, a lower shear box, an X-axis left hydraulic cylinder, an X-axis right hydraulic cylinder, an X-axis left pressure head, an X-axis right pressure head, an X-axis left pressure sensor, an X-axis right pressure sensor, an X-axis displacement sensor, and an X-axis 10 displacement sensor. The pore pressure loading system includes an air cylinder, a pressure gauge, a pressure reducing valve, a fluid inlet pipeline, a fluid outlet pipeline, and a flowmeter.

20 Claims, 2 Drawing Sheets

(52) U.S. Cl.
CPC ............... *G01N 2203/0025* (2013.01); *G01N 2203/0048* (2013.01); *G01N 2203/0254* (2013.01); *G01N 2203/0658* (2013.01); *G01N 2203/0676* (2013.01)

(58) Field of Classification Search
CPC ... G01N 2203/0048; G01N 2203/0254; G01N 2203/0658; G01N 2203/0676; G01N 3/24; G01N 3/02; G01N 15/082; G01N 15/0806; G01N 3/12
See application file for complete search history.

RECIPROCATING ROCK FRACTURE FRICTION-SEEPAGE CHARACTERISTIC TEST DEVICE AND METHOD

TECHNICAL FIELD

The present disclosure relates to the field of rock mechanics and engineering geology experiments, and in particular, to a reciprocating rock fracture friction-seepage characteristic test device and method.

BACKGROUND

Human activities, such as oil, gas, and geothermal energy development and wastewater disposal, related to water injection may induce seismic activities and disaster risks. The injection of a large amount of high-pressure fluid into the formation changes the crustal stress field of a reservoir and reduces the effective stress that originally acts on a fault and a fracture surface, which may cause the sliding of the fault and the fracture and lead to a seismic phenomenon. The sliding stability of the fault and the fracture surface will directly determine whether the sliding form is stable creep sliding or unstable seismic sliding, and the sliding process will also lead to the change of permeability of surrounding rock mass. Similarly, there are also similar engineering problems in the geological sequestration of carbon dioxide. The evolution of caprock permeability under multiple physical field changes will directly affect the geological sequestration effect of carbon dioxide. To efficiently and safely carry out hydraulic fracturing operations, wastewater disposal, geological sequestration of carbon dioxide, and the like in energy development, it is very necessary to scientifically evaluate the friction-seepage characteristics of a fracture of a reservoir and a cap rock. However, due to the large depth of the reservoir and the caprock and complex and changeable conditions, it is difficult to measure the friction-seepage related parameters directly under the condition of crustal stress. Therefore, it is necessary to carry out simulation experiments in the laboratory so as to be promoted in actual operation. Therefore, there were researchers researched the friction-seepage characteristics in the sliding process of rock fractures. For example, the test device for determining the shear strength of a rock and the friction and sliding features of a shear fracture disclosed by CN208921564U uses a pressure head of a triaxial rock mechanics testing machine to apply an axial load to an upper shear disc to make the upper shear disc and a lower shear disc slide relatively along an upper shear slope and a lower shear slope. Meanwhile, the changes of axial displacement and axial load with time are recorded, and the shear strength and the friction and sliding characteristics of the rock are obtained simultaneously. The method for measuring the permeability of a matrix and a fracture by using a pressure pulse measurement device disclosed by CN103257089A uses a pressure pulse measuring device and provides a method that can measure the permeability of the matrix and the fracture by performing one test on a rock core with a fracture. However, these researches still have the following disadvantages:

(1) The existing rock direct-shear apparatus cannot simulate the triaxial crustal stress state of a deep position where the rock is located and cannot accurately measure the fracture surface's friction characteristic under the condition of the crustal stress.

(2) The existing measurement of friction coefficient of the rock fractures in laboratory experiments mostly adopts an direct-shear mode. During the sliding process of a fracture, due to a stress concentration phenomenon caused by the load cell, it is difficult to ensure that the fracture slides along the direction of the fracture surface so that an upper fracture surface and a lower fracture surface cannot be in complete contact with each other, thereby resulting in inaccurate measurement results.

(3) The existing test device cannot simultaneously measure the friction characteristics of the fracture and the fracture permeability evolution, and cannot simultaneously characterize the mechanical properties and seepage (hydraulics) characteristics of the rock fracture.

SUMMARY

The objective of the present disclosure is to provide a reciprocating rock fracture friction-seepage characteristic test device and method, so as to perform a friction-seepage experiment on a rock fracture surface in a sliding process in a laboratory, and meanwhile, efficiently and accurately measure the friction coefficient and the stability parameter and the permeability of the fracture surface in the sliding process.

The reciprocating rock fracture friction-seepage characteristic test device disclosed by the present disclosure includes an X-axis shear system, a Y-axis stress loading system, a Z-axis stress loading system, a servo oil source system, a pore pressure loading system, and a host.

The X-axis shear system includes an X-axis EDC controller, an upper shear box, a lower shear box, an X-axis left hydraulic cylinder, an X-axis right hydraulic cylinder, an X-axis left pressure head, an X-axis right pressure head, an X-axis left pressure sensor, an X-axis right pressure sensor, and an X-axis displacement sensor. The servo oil source system supplies oil to the X-axis left hydraulic cylinder and the X-axis right hydraulic cylinder. The lower shear box, the X-axis left hydraulic cylinder, and the X-axis right hydraulic cylinder are separately fixedly mounted. The upper shear box and the lower shear box directly face each other and are parallel to each other to form a cavity that can accommodate a rock specimen. A left connecting hole is formed in the lower edge of the left side wall of the upper shear box and the upper edge of the left side wall of the lower shear box in a mode of forming gaps oppositely. A right connecting hole is formed in the lower edge of the right side wall of the upper shear box and the upper edge of the right side wall of the lower shear box in a mode of forming gaps oppositely. The end part of a piston rod of the X-axis left hydraulic cylinder is fixedly connected to the X-axis left pressure head. The X-axis left pressure head acts on the left side of the upper shear box. A left shear force is applied to the upper shear box through the X-axis left pressure head. The X-axis left pressure sensor is mounted at the position where the left shear force can be measured and is electrically connected to the X-axis EDC controller through a signal line. The end part of the piston rod of the X-axis right hydraulic cylinder is fixedly connected to the X-axis right pressure head. The X-axis right pressure head acts on the right side of the upper shear box. A right shear force is applied to the upper shear box through the X-axis right pressure head. The X-axis right pressure sensor is mounted at the position where the right shear force can be measured and is electrically connected to the X-axis EDC controller through a signal line. The X-axis displacement sensor is mounted at the position where fracture surface sliding displacement formed by shearing can be measured and is electrically connected to the X-axis EDC controller through a signal line. The X-axis EDC controller is electrically connected to the host and a directional valve used for switching oil supply of the X-axis left hydraulic cylinder and the X-axis right hydraulic cylinder and an X-axis electro-hydraulic servo valve used for regulating the oil flow of oil supply of the X-axis left hydraulic cylinder and the X-axis right hydraulic cylinder in the servo oil source system through signal lines.

The Y-axis stress loading system can load Y-axis stress (namely, the stress in the Y-axis direction) on the upper shear box, the lower shear box, and the rock specimen. The Z-axis stress loading system can load Z-axis stress (namely, the stress in the Z-axis direction) on the upper shear box, the lower shear box, and the rock specimen.

The pore pressure loading system includes a gas cylinder, a pressure gauge, a pressure reducing valve, a fluid inlet pipeline, a fluid outlet pipeline, and a flowmeter. The pressure gauge and the pressure reducing valve are mounted on the fluid inlet pipeline. One end of the fluid inlet pipeline is inserted into the right connecting hole and can be in contact with the rock specimen. The other end of the fluid inlet pipeline is connected to the gas cylinder. The flowmeter is mounted on the fluid outlet pipeline and is electrically connected to the host through a signal line. One end of the fluid outlet pipeline is inserted into the left connecting hole and can be in contact with the rock specimen. The other end of the fluid outlet pipeline is directly connected to the atmosphere.

Preferably, the detection device further includes an acoustic emission detection system. The acoustic emission detection system includes an acoustic emission signal analyzer, an acoustic emission probe, and an acoustic reception probe. The acoustic emission probe is mounted on the left side wall of the upper shear box or the left side wall of the lower shear box and is electrically connected to the acoustic emission signal analyzer through a signal line. The acoustic reception probe is mounted on the right side wall of the upper shear box or the right side wall of the lower shear box and is electrically connected to the acoustic emission signal analyzer through a signal line. The acoustic emission signal analyzer is electrically connected to the host through a signal line. The fracture information and damage situation of the rock specimen in the X-axis direction and the Z-axis direction can be dynamically collected by using the acoustic emission detection system in the sliding process of the fracture surface and are represented on an interface of the host.

Preferably, the X-axis displacement sensor consists of an X-axis left displacement sensor and an X-axis right displacement sensor. The X-axis left displacement sensor is mounted on the X-axis left pressure head and is electrically connected to the X-axis EDC controller through a signal line. The X-axis right displacement sensor is mounted on the X-axis right pressure head and is electrically connected to the X-axis EDC controller through a signal line. The displacement of the X-axis left pressure head is measured by using the X-axis left displacement sensor, and the displacement of the X-axis right pressure head is measured by using the X-axis right displacement sensor. A measurement error can be eliminated by performing differential analysis on the two displacements so that the measurement of the sliding displacement of the fracture surface formed by shearing is more accurate.

Preferably, the inner surface of the upper shear box is coated with a sealing rubber layer that can fill the gap between the upper shear box and the rock specimen. The inner surface of the lower shear box is also coated with a sealing rubber layer that can fill the gap between the lower shear box and the rock specimen. The sealing rubber layers can prevent a seepage fluid medium from flowing into the fluid outlet pipeline from the gap between the upper shear box and the rock specimen and the gap between the lower shear box and the rock specimen so as to ensure the accuracy of a permeability test. The upper shear box and the lower shear box are sealed by a sealing strip. The sealing strip can avoid the leakage of the seepage fluid medium.

Preferably, the Y-axis stress loading system includes a Y-axis EDC controller, a Y-axis hydraulic cylinder, a Y-axis pressure head, a Y-axis pressure plate corresponding to the Y-axis pressure head, a Y-axis pressure sensor, and a Y-axis loading frame. The Y-axis loading frame is a square-shaped frame formed by vertically connecting a front steel plate, a rear steel plate, a left steel plate, and a right steel plate. The servo oil source system supplies oil to the Y-axis hydraulic cylinder. The Y-axis hydraulic cylinder is fixedly mounted on the front steel plate. The end part of a piston rod of the Y-axis hydraulic cylinder is fixedly connected to the Y-axis pressure head. The Y-axis pressure plate is fixedly mounted on the rear steel plate. The Y-axis pressure head acts on the front sides of the upper shear box and the lower shear box. The Y-axis pressure plate acts on the rear sides of the upper shear box and the lower shear box. Y-axis stress can be loaded on the upper shear box, the lower shear box, and the rock specimen through the coordination of the Y-axis pressure head and the Y-axis pressure plate. The Y-axis pressure sensor is mounted at the position where the Y-axis stress can be measured and is electrically connected to the Y-axis EDC controller through a signal line. The Y-axis EDC controller is electrically connected to the host, and a Y-axis electro-hydraulic servo valve used for regulating the oil flow of the oil supply of the Y-axis left hydraulic cylinder in the servo oil source system through signal lines.

Preferably, the Y-axis stress loading system further includes a Y-axis displacement sensor. The Y-axis displacement sensor is mounted at the position where the displacement of the Y-axis pressure head can be measured and is electrically connected to the Y-axis EDC controller through a signal line.

Preferably, the X-axis left hydraulic cylinder is fixedly mounted on the left steel plate. The X-axis right hydraulic cylinder is fixedly mounted on the right steel plate.

Preferably, the Z-axis stress loading system includes a Z-axis EDC controller, a Z-axis hydraulic cylinder, a Z-axis pressure head, a Z-axis pressure plate corresponding to the Z-axis pressure head, a Z-axis pressure sensor, a Z-axis displacement sensor, a door-shaped frame, and a pressure chamber. The Z-axis pressure plate is fixedly mounted at the bottom of the pressure chamber. The lower shear box is fixedly mounted on the Z-axis pressure plate. The servo oil source system supplies oil to the Z-axis hydraulic cylinder. The Z-axis hydraulic cylinder is suspended in the pressure chamber through the door-shaped frame mounted at the top of the pressure chamber. The Z-axis hydraulic cylinder is provided with two piston rods. The Z-axis displacement sensor is mounted at the end part of the upper piston rod of the Z-axis hydraulic cylinder. The end part of the lower piston rod of the Z-axis hydraulic cylinder is fixedly connected to one end of the Z-axis pressure sensor. The other end of the Z-axis pressure sensor is fixedly connected to the Z-axis pressure head. The Z-axis pressure head acts on the upper side of the upper shear box. Z-axis stress can be loaded on the upper shear box, the lower shear box, and the rock specimen through the coordination of the Z-axis pressure head and the Z-axis pressure plate. The Z-axis pressure sensor and the Z-axis displacement sensor are separately electrically connected to the Z-axis EDC controller through signal lines. The Z-axis EDC controller is electrically connected to the host, and a Z-axis electro-hydraulic servo valve used for regulating the oil flow of the oil supply of the Z-axis hydraulic cylinder in the servo oil source system through signal lines.

A reciprocating rock fracture friction-seepage characteristic test method of the present disclosure uses the test device above and includes:

step one, preparing a rock specimen, and uniformly coating the outer surface of the rock specimen with a layer of polyurethane sealing rubber;

step two, placing the rock specimen, which is coated with the layer of polyurethane sealing rubber, into the lower shear box, injecting polyurethane sealing rubber that can fill a gap between the lower shear box and the rock specimen into the gap, then covering the lower shear box with the upper shear box, and injecting polyurethane sealing rubber that can fill a gap between the upper shear box and the rock specimen into the gap;

step three, fixedly mounting the lower shear box on the Z-axis pressure plate so that the Y-axis pressure plate is in contact with the rear sides of the upper shear box and the lower shear box, and the Y-axis pressure head is in contact with the front sides of the upper shear box and the lower shear box, the Z-axis pressure head is in contact with the upper side of the upper shear box, the X-axis left pressure head is in contact with the left side of the upper shear box, and the X-axis right pressure head is in contact with the right side of the upper shear box;

step four, inserting one end of the fluid inlet pipeline in the pore pressure loading system into the right connecting hole to be in contact with the rock specimen; inserting one end of the fluid outlet pipeline into the left connecting hole to be in contact with the rock specimen;

step five, performing vacuuming on pipelines in various systems of the test device;

step six, mounting an acoustic emission probe and an acoustic reception probe;

step seven, loading Z-axis stress and Y-axis stress on the upper shear box, the lower shear box, and the rock specimen therein;

step eight, loading pore pressure in a mode of introducing a seepage fluid medium into the fluid inlet pipeline;

step nine, applying a left shear force or a right shear force to the upper shear box and the rock specimen therein at a first preset X-axis loading rate, where when the left shear force or right shear force to be loaded increases, decreases, and then remains stable, it means that the shearing is completed to form the fracture surface; continuously loading the left shear force or the right shear force at a first preset X-axis loading rate, where the fracture surface starts sliding, the X-axis loading rate and the X-axis loading direction can be changed according to experimental needs in the sliding process of the fracture surface, and the reciprocating loading is performed in a mode of changing the X-axis loading direction;

step ten, calculating to obtain the friction coefficient $\mu$ of the fracture surface by using a formula $\mu=\tau/\sigma$; calculating to obtain the stability parameter (a−b) of the fracture surface by using a formula $(a-b)=(\mu^{i+1}-\mu^{i})/\ln(V^{i+1}/V^{i})$; calculating to obtain the permeability k of the fracture surface in the sliding process by using a formula $k=(-12\eta LQ/W\Delta P)^{2/3}/12$, where $\tau$ is an X-axis shear force, and $\tau$ equals to the left shear force or the right shear force, $\sigma$ is the Z-axis stress; $\mu^i$ is the friction coefficient of the fracture surface when the X-axis loading rate is $V^i$ after the fracture surface is formed; $\mu^{i+1}$ is the friction coefficient of the fracture surface when the X-axis loading rate is $V^{i+1}$ after the fracture surface is formed; $\Delta P$ is a pressure difference between a pressure gauge reading and atmosphere pressure; $\eta$ is the dynamic viscosity of the seepage fluid medium; L is the length of a fracture contact surface in the sliding process; W is the width of the fracture surface; Q is the reading of the flowmeter.

By using the present disclosure, a friction-seepage experiment of the fracture surface of the rock in the sliding process can be performed in the laboratory, and the friction coefficient, the stability parameter of the fracture surface, and the permeability in the sliding process can be measured efficiently and accurately, which realizes simultaneous measurement of the friction characteristics of the rock fracture and the fracture permeability evolution laws, and can simultaneously characterize the mechanical properties and seepage (hydraulics) characteristics of the rock fracture, provides a basis for region selection and layer section of operations, such as water injection, and can effectively avoid an unstable seismic sliding of the fracture in a reservoir or a cap rock caused by the operations, such as water injection. Meanwhile, the test device is simple in structure, high in accuracy, and stable in operation, and can be widely applied to a mechanical-hydraulic coupling property test of the rock fracture in the laboratory.

DETAILED DESCRIPTION

The present disclosure will be described in detail below with reference to the accompanying drawings.

Figure 1:
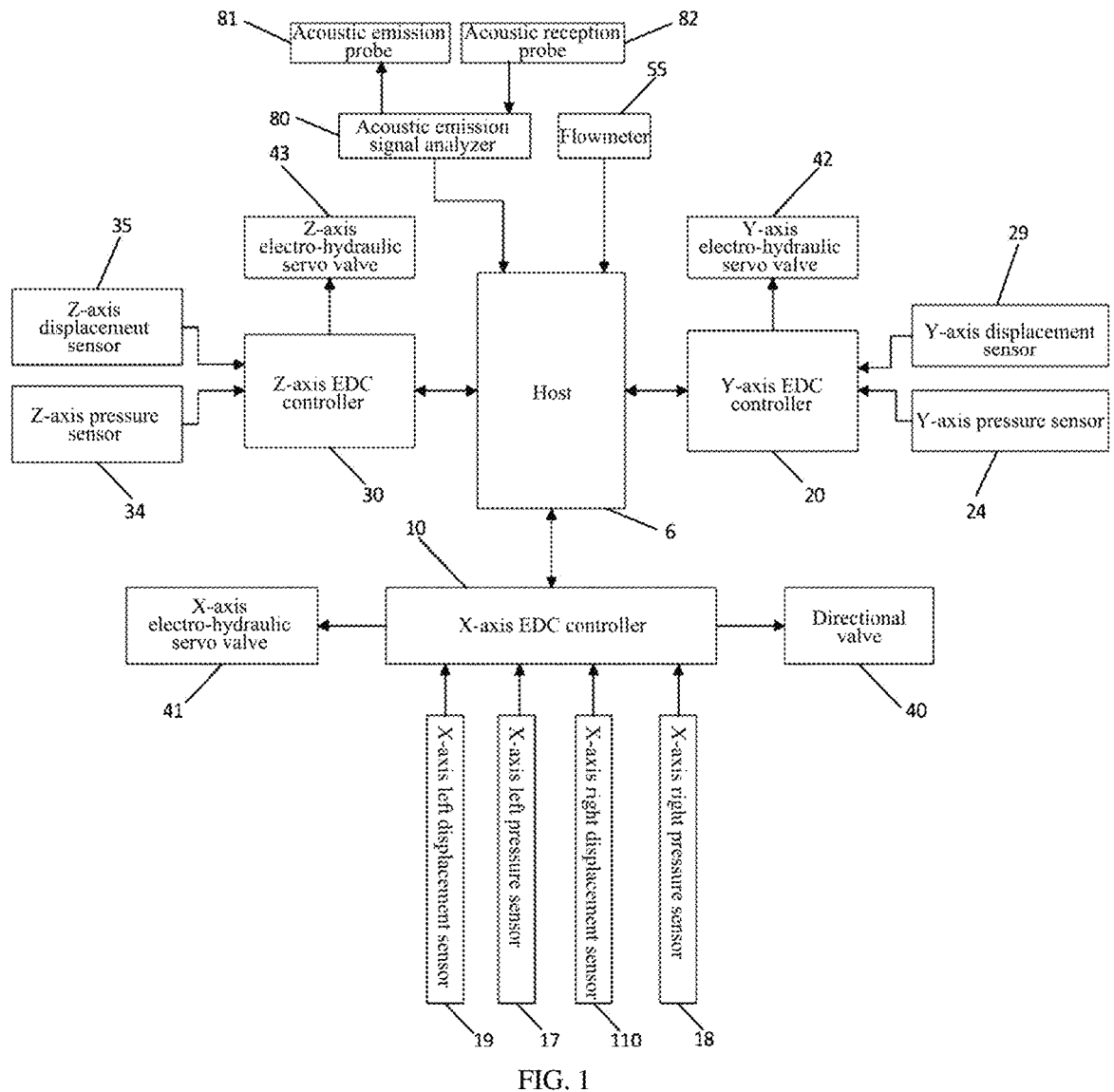
FIG. 1 is a circuit principle block diagram of the present disclosure.
Figure 2:
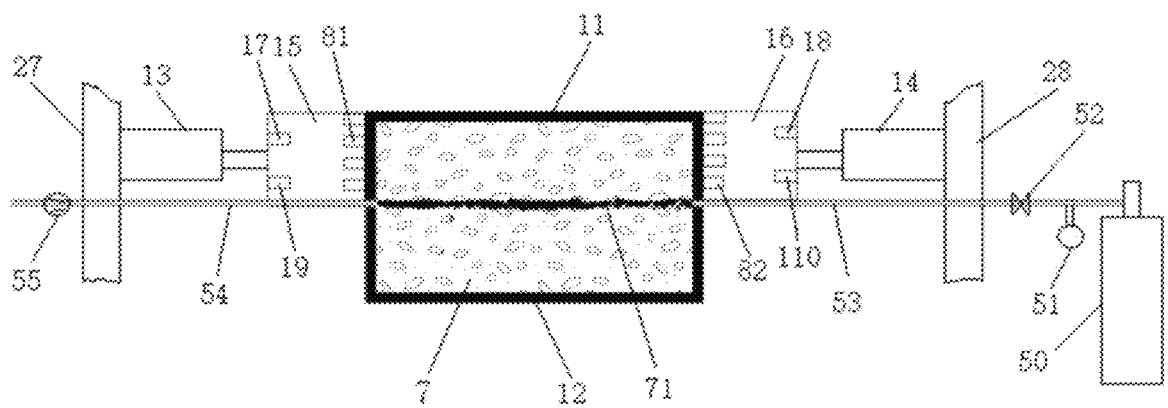
FIG. 2 is a schematic structural diagram of an X-axis shear system and a pore pressure loading system of the present disclosure.
Figure 3:
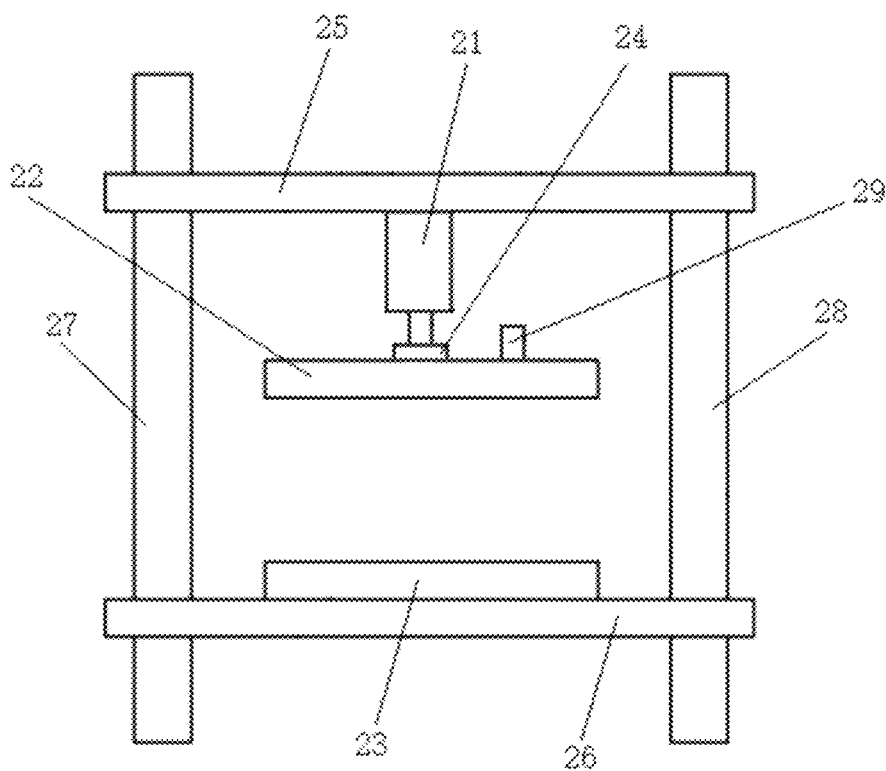
FIG. 3 is a schematic structural diagram of a Y-axis stress loading system of the present disclosure.
Figure 4:
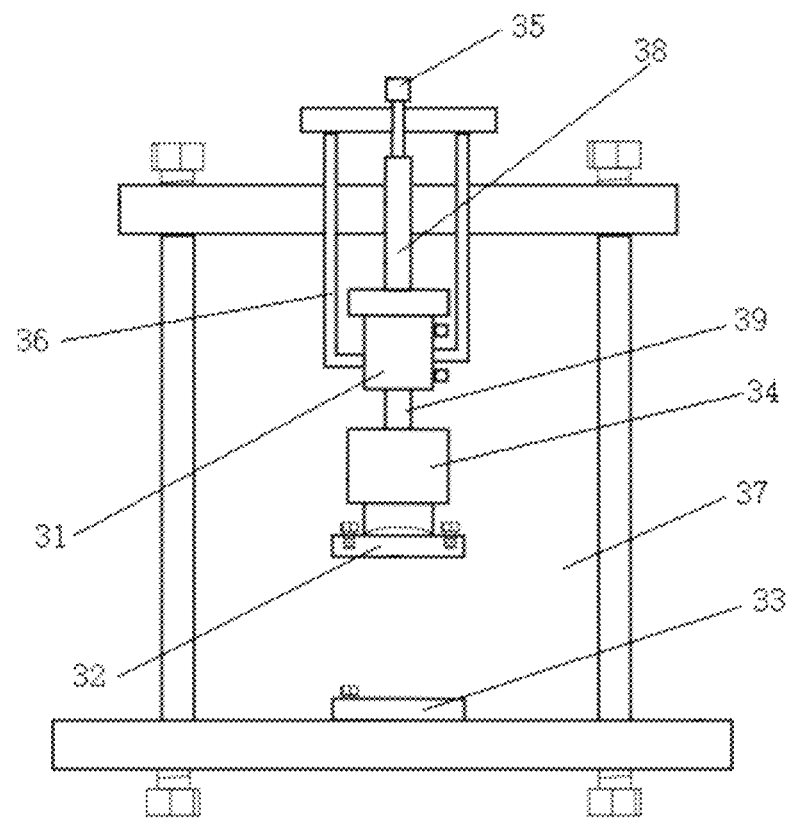
FIG. 4 is a schematic structural diagram of a Z-axis stress loading system of the present disclosure.

The reciprocating rock fracture friction-seepage characteristic test device as shown in FIG. 1 to FIG. 4 includes an X-axis shear system, a Y-axis stress loading system, a Z-axis stress loading system, a servo oil source system, a pore pressure loading system, an acoustic emission detection system, and a host 6.

The servo oil source system (prior art) is the power source of an X-axis shear force, Y-axis stress loading, and z-axis stress loading and consists of an oil tank, oil pump-motor group, a precise oil filter, a relief valve, a pressure gauge, an air filter, a transducer, a directional valve 40 (electromagnetic directional valve), an X-axis electrohydraulic servo valve 41, a Y-axis electrohydraulic servo valve 42, a Z-axis electrohydraulic servo valve 43, and the like which are connected through an oil way. In order to achieve a precise servo, the X-axis electrohydraulic servo valve 41, the Y-axis electrohydraulic servo valve 42, and the Z-axis electrohydraulic servo valve 43 all adopt the MOOG-D633 precise servo valves produced by MOOG Company in America.

The X-axis shear system includes an X-axis EDC controller 10, an upper shear box 11, a lower shear box 12, an X-axis left hydraulic cylinder 13, an X-axis right hydraulic cylinder 14, an X-axis left pressure head 15, an X-axis right pressure head 16, an X-axis left pressure sensor 17, an X-axis right pressure sensor 18, an X-axis displacement sensor 19, and an X-axis right displacement sensor 110. When a motor in the servo oil source system drives an oil pump to rotate, high-pressure oil enters the X-axis left hydraulic cylinder 13 and the X-axis right hydraulic cylinder 14 to supply oil to the X-axis left hydraulic cylinder 13 and the X-axis right hydraulic cylinder 14 after passing through the precise oil filter, the relief valve, the X-axis electrohydraulic servo valve 41, and the directional valve 40 in sequence. The upper shear box 11 and the lower shear box 12 directly face each other and are parallel to each other to form a cavity that can accommodate a rock specimen 7. The inner surface of the upper shear box 11 is coated with a polyurethane sealing rubber layer that can fill the gap between the upper shear box 11 and the rock specimen 7. The inner surface of the lower shear box 12 is also coated with a polyurethane sealing rubber layer that can fill the gap between the lower shear box 12 and the rock specimen 7. The upper shear box 11 and the lower shear box 12 are sealed by a sealing strip (EPDM rubber sealing strip). A left connecting hole is formed in the lower edge of the left side wall of the upper shear box 11 and the upper edge of the left side wall of the lower shear box 12 in a mode of forming gaps oppositely. A right connecting hole is formed in the lower edge of the right side wall of the upper shear box 11 and the upper edge of the right side wall of the lower shear box 12 in a mode of forming gaps oppositely. The end part of a piston rod of the X-axis left hydraulic cylinder 13 is fixedly connected to the X-axis left pressure head 15. The X-axis left pressure head 15 acts on the left side of the upper shear box 11. A left shear force is applied to the upper shear box 11 through the X-axis left pressure head 15. Both the X-axis left pressure sensor 17, and the X-axis left displacement sensor 19 are mounted on the X-axis left pressure head 15 and are separately electrically connected to the X-axis EDC controller 10 through signal lines. The end part of the piston rod of the X-axis right hydraulic cylinder 14 is fixedly connected to the X-axis right pressure head 16. The X-axis right pressure head 16 acts on the right side of the upper shear box 11. A right shear force is applied to the upper shear box 11 through the X-axis right pressure head 16. Both the X-axis right pressure sensor 18 and the X-axis right displacement sensor 110 are mounted on the X-axis right pressure head 16 and are separately electrically connected to the X-axis EDC controller 10 through signal lines. The X-axis EDC controller 10 is electrically connected to host 6, the directional valve 40, and the X-axis electro-hydraulic servo valve 41 through signal lines. Host 6 sends an amplitude command for applying an X-axis left shear force to the X-axis EDC controller 10, the X-axis left pressure sensor 17 feeds back a detected X-axis left shear force signal to the X-axis EDC controller 10, the X-axis EDC controller 10 controls the directional valve 40 to switch to a left oil way according to the X-axis left shear force amplitude command and the feedback X-axis left shear force signal and controls the opening degree of the Y-axis electrohydraulic servo valve 41 to regulate the oil flow of oil supply of the X-axis left hydraulic cylinder 13 to make the piston rod of the X-axis left hydraulic cylinder 13 move, thereby realizing closed-loop control of the X-axis left the shear force. Host 6 sends an amplitude command for applying an X-axis right shear force to the X-axis EDC controller 10, the X-axis right pressure sensor 18 feeds back a detected X-axis right shear force signal to the X-axis EDC controller 10, the X-axis EDC controller 10 controls the directional valve 40 to switch to a right oil way according to the X-axis right shear force amplitude command and the feedback X-axis right shear force signal, and controls the opening degree of the Y-axis electrohydraulic servo valve 41 to regulate the oil flow of oil supply of the X-axis right hydraulic cylinder 14 to make the piston rod of the X-axis right hydraulic cylinder 14 move, thereby realizing closed-loop control of the X-axis right shear force. Reciprocating shear can be realized through a direction-changing effect of the directional valve 40. The X-axis displacement sensor 19 sends the detected X-axis left pressure head displacement to the X-axis EDC controller 10. The X-axis right displacement sensor 110 sends the detected X-axis right pressure head displacement to the X-axis EDC controller 10. The X-axis EDC controller 10 sends the X-axis left pressure head displacement and the X-axis right pressure head displacement to the host 6 for processing, and the sliding displacement of the fracture surface can be calculated according to the two displacements after the fracture surface is formed.

The Y-axis stress loading system includes a Y-axis EDC controller 20, a Y-axis hydraulic cylinder 21, a Y-axis pressure head 22, a Y-axis pressure plate 23 corresponding to the Y-axis pressure head 22, a Y-axis pressure sensor 24, a Y-axis pressure sensor 29, and a Y-axis loading frame. The Y-axis loading frame is a square-shaped frame formed by vertically connecting a front steel plate 25, a rear steel plate 26, a left steel plate 27, and a right steel plate 28. The X-axis left hydraulic cylinder 13 is fixedly mounted on the left steel plate 27. The X-axis right hydraulic cylinder 14 is fixedly mounted on the right steel plate 28. When the motor in the servo oil source system drives the oil pump to rotate, high-pressure oil enters the Y-axis hydraulic cylinder 21 to supply oil to the Y-axis hydraulic cylinder 21 after passing through the precise oil filter, the relief valve, the Y-axis electrohydraulic servo valve 42 in sequence. The Y-axis hydraulic cylinder 21 is fixedly mounted on the front steel plate 25. The end part of a piston rod of the Y-axis hydraulic cylinder 21 is fixedly connected to the Y-axis pressure head 22 through the Y-axis pressure sensor 24. The Y-axis pressure plate 23 is fixedly mounted on the rear steel plate 26. The Y-axis pressure head 22 acts on the front sides of the upper shear box and the lower shear box. The Y-axis pressure plate 23 acts on the rear sides of the upper shear box and the lower shear box. Y-axis stress can be loaded on the upper shear box, the lower shear box, and the rock specimen through the coordination of the Y-axis pressure head 22 and the Y-axis pressure plate 23. The Y-axis pressure sensor 29 is mounted on the Y-axis pressure head 22. The Y-axis pressure sensor 24 and the Y-axis pressure sensor 29 are separately electrically connected to the Y-axis EDC controller 20 through signal lines. The Y-axis EDC controller 20 is electrically connected to host 6, and the Y-axis electrohydraulic servo valve 42 through signal lines. The host 6 sends an amplitude command for applying a Y-axis stress to the X-axis EDC controller 20, the Y-axis pressure sensor 24 feeds back a detected X-axis right shear force signal to the X-axis EDC controller 20, the X-axis EDC controller 20 controls, according to the Y-axis stress amplitude command and the feedback Y-axis stress signal, the opening degree of the Y-axis electrohydraulic servo valve 42 to regulate the oil flow of oil supply of the Y-axis hydraulic cylinder 21 to make the piston rod of the Y-axis hydraulic cylinder 21 move, thereby realizing closed-loop control of the Y-axis stress. The host 6 sends a displacement amplitude command for applying the Y-axis stress to make the Y-axis pressure head move to the Y-axis EDC controller 20, the Y-axis displacement sensor 29 feeds back a detected Y-axis pressure head displacement signal to the Y-axis EDC controller 20, the Y-axis EDC controller 20 controls, according to the displacement amplitude command for making the Y-axis pressure head move and the feedback Y-axis pressure head displacement signal, the opening valve of the Y-axis electrohydraulic servo valve 42 to regulate the oil flow of oil supply of the Y-axis hydraulic cylinder 21 to make the piston rod of the Y-axis hydraulic cylinder 21 move, thereby realizing closed-loop control of the Y-axis displacement amplitude.

The Z-axis stress loading system includes a Z-axis EDC controller 30, a Z-axis hydraulic cylinder 31, a Z-axis pressure head 32, a Z-axis pressure plate 33 corresponding to the Z-axis pressure head 32, a Z-axis pressure sensor 34, a Z-axis displacement sensor 35, a door-shaped frame 36, and a pressure chamber 37. The Z-axis pressure plate 33 is fixedly mounted at the bottom of the pressure chamber 37. The lower shear box 12 is fixedly mounted on the Z-axis pressure plate 33. When the motor in the servo oil source system drives the oil pump to rotate, high-pressure oil enters the Z-axis hydraulic cylinder 31 to supply oil to the Z-axis left hydraulic cylinder 31 after passing through the precise oil filter, the relief valve, and the Z-axis electrohydraulic servo valve 43 in sequence. The Z-axis hydraulic cylinder 31 is suspended in the pressure chamber 37 through the door-shaped frame 36 mounted at the top of the pressure chamber 37. The Z-axis hydraulic cylinder 31 is provided with two piston rods. The Z-axis displacement sensor 35 is mounted at the end part of the upper piston rod 38 of the Z-axis hydraulic cylinder 31. The end part of the lower piston rod 39 of the Z-axis hydraulic cylinder 31 is fixedly connected to one end of the Z-axis pressure sensor 34. The other end of the Z-axis pressure sensor 34 is fixedly connected to the Z-axis pressure head 32. The Z-axis pressure head 32 acts on the upper side of the upper shear box 11. Z-axis stress can be loaded on the upper shear box, the lower shear box, and the rock specimen through the coordination of the Z-axis pressure head 32 and the Z-axis pressure plate 33. The Z-axis pressure sensor 34 and the Z-axis displacement sensor 35 are separately electrically connected to the Z-axis EDC controller 30 through signal lines. The Z-axis EDC controller 30 is electrically connected to the host 6 and the Z-axis electro-hydraulic servo valve 43 through signal lines. The host 6 sends an amplitude command for applying a Z-axis stress to the Z-axis EDC controller 30, the Z-axis pressure sensor 34 feeds back a detected Z-axis stress signal to the Z-axis EDC controller 30, the Z-axis EDC controller 30 controls, according to the Z-axis stress amplitude command and the feedback Z-axis stress signal, the opening degree of the Z-axis electrohydraulic servo valve 43 to regulate the oil flow of oil supply of the Z-axis hydraulic cylinder 31 to make the piston rod of the Z-axis hydraulic cylinder 31 move, thereby realizing closed-loop control of the Z-axis right shear force. The host 6 sends a displacement amplitude command for applying a Z-axis stress to make the Z-axis pressure head move to the Z-axis EDC controller 30, the X-axis right pressure sensor 35 feeds back a detected Z-axis pressure head displacement signal to the Z-axis EDC controller 30, the Z-axis EDC controller 30 controls, according to the Z-axis pressure head movement displacement amplitude command and the feedback Z-axis pressure head displacement signal, the opening degree of the Z-axis electrohydraulic servo valve 43 to regulate the oil flow of oil supply of the Z-axis right hydraulic cylinder 31 to make the upper piston rod and the lower piston rod of the Z-axis right hydraulic cylinder 31 move, thereby realizing closed-loop control of the Z-axis displacement amplitude.

The pore pressure loading system includes a gas cylinder 50, a pressure gauge 51, a pressure reducing valve 52, a fluid inlet pipeline 53, a fluid outlet pipeline 54, and a flowmeter 55. The pressure gauge 51 and the pressure reducing valve 52 are mounted on the fluid inlet pipeline 53. One end of the fluid inlet pipeline 53 is inserted into the right connecting hole and can be in contact with the rock specimen 7. The other end of the fluid inlet pipeline 53 is connected to the gas cylinder 50. The flowmeter 55 is mounted on the fluid outlet pipeline 54 and is electrically connected to the host 6 through a signal line. One end of the fluid outlet pipeline 54 is inserted into the left connecting hole and can be in contact with the rock specimen 7. The other end of the fluid outlet pipeline 54 is directly connected to the atmosphere. The flowmeter 55 sends the flow of a seepage fluid medium that flows through a fracture surface to the host 6. The gas cylinder 50 is a carbon dioxide cylinder (the gas cylinder 50 may also be a nitrogen cylinder, a helium cylinder, or the like).

An acoustic emission detection system includes an acoustic emission signal analyzer 80, an acoustic emission probe 81, and an acoustic reception probe 82. The acoustic emission probe 81 is mounted on the left side wall of the upper shear box 11 (can avoid the X-axis left pressure head 15) and is electrically connected to the acoustic emission signal analyzer 80 through a signal line. The acoustic reception probe 82 is mounted on the right side wall of the upper shear box 11 (can avoid the X-axis right pressure head 16) and is electrically connected to the acoustic emission signal analyzer 80 through a signal line. The acoustic emission signal analyzer 80 is electrically connected to the host 6 a signal line. The fracture information and the damage situation of the rock specimen in the X-axis direction and the Z-axis direction can be dynamically collected by using the acoustic emission detection system in a sliding process of the fracture surface and are represented on an interface of the host.

A reciprocating rock fracture friction-seepage characteristic test method using the test device includes:

Step one, rock specimen 7 is prepared; the outer surface of rock specimen 7 is coated with a layer of polyurethane sealing rubber of about 1 mm. The sizes of the rock used in the method are as follows: 150.00 mm in the length direction (namely, the X-axis direction), 100.00 mm in the width direction (namely, the Y-axis direction), and 100.00 mm in the height direction (namely, the Z-axis direction).

Step two, the rock specimen 7 which is coated with the layer of polyurethane sealing rubber is placed into the lower shear box 12, the polyurethane sealing rubber that can fill the gap between the lower shear box 12 and the rock specimen 7 is injected into the gap, then, the lower shear box 12 is covered with the upper shear box 11, and the polyurethane sealing rubber that can fill the gap between the upper shear box 11 and the rock specimen 7 is injected into the gap.

Step three, the lower shear box 12 is fixedly mounted on the Z-axis pressure plate 33, so that the Y-axis pressure plate 23 is in contact with the rear sides of the upper shear box and the lower shear box, and the Y-axis pressure head 22 is in contact with the front sides of the upper shear box and the lower shear box, the Z-axis pressure head 32 is in contact with the upper side of the upper shear box 11, the X-axis left pressure head 15 is in contact with the left side of the upper shear box 11, and the X-axis right pressure head 16 is in contact with the right side of the upper shear box 11.

Step four, one end of the fluid inlet pipeline 53 in the pore pressure loading system is inserted into the right connecting hole to be in contact with the rock specimen 7, and one end of the fluid outlet pipeline 54 is inserted into the left connecting hole to be in contact with the rock specimen 7.

Step five, vacuuming is performed on pipelines in various systems of the test device by using a vacuum pump.

Step six, the acoustic emission probe 81 and the acoustic reception probe 82 are mounted according to experimental needs.

Step seven, Z-axis stress and Y-axis stress are loaded on the upper shear box, the lower shear box, and the rock specimen therein. The Z-axis stress is 10.0 MPa, the Z-axis stress loading rate is 0.1 MPa/s, the Y-axis stress is 1.0 MPa, and the Y-axis stress loading rate is 0.1 MPa/s. After loading is completed, the Z-axis stress and the Y-axis stress are stabilized for 0.5 hour to make the stress loading of the rock specimen 7 stable, and the next step is performed after the stress loading is stable.

Step eight, pore pressure is loaded in a mode of introducing a seepage fluid medium, namely, carbon dioxide, into the fluid inlet pipeline 53. The pore pressure is loaded in a constant pressure control mode, where the pressure is set as 0.5 MPa, and the pore pressure loading rate is 0.01 MPa/s. The next step can be performed when the flow is stable.

Step nine, the friction-seepage characteristic experiment is performed, and the shear force is loaded according to a preset shear force loading mode. A left shear force or a right shear force is applied to the upper shear box 11 and the rock specimen 7 therein at an X-axis loading rate of 1 μm/s; when the left shear force or the right shear force to be loaded increases, decreases, and then remains stable, it means that the shearing is completed to form the fracture surface 71; the left shear force or the right shear force is continuously loaded at the X-axis loading rate of 1 μm/s, and the fracture surface starts sliding; the X-axis loading rate is regulated to be 10 μm/s after the sliding displacement reaches 0.5 mm; the left shear force or the right shear force is loaded at the X-axis loading rate of 1 μm/s after the sliding displacement passes through 0.5 mm again; the left shear force or the right shear force is loaded at the X-axis loading rate of 10 μm/s after the sliding displacement passes through 0.5 mm again; the loading rate regulating process is repeated until the total sliding displacement reaches 15.0 mm. In the sliding process of the fracture surface, the X-axis loading direction can be changed according to experimental requirements (that is, the left shear force or the right shear force is selected to be loaded), and the reciprocating loading is performed in the mode of changing the X-axis loading direction.

Step ten, experimental results are analyzed. A fracture surface friction coefficient μ is calculated by using a formula $\mu=\tau/\sigma$, where τ is the X-axis shear force, and τ equals to the left shear force or the right shear force, and σ is Z-axis stress. The stability parameter (a−b) of the fracture surface can be calculated by formula $(a-b)=(\mu^{i+1}-\mu^i)/\ln(V^{i+1}/V^i)$ according to a velocity-state law through a variable sliding rate experiment, where $\mu^i$ is the friction coefficient of the fracture surface when the X-axis loading rate (namely, the sliding rate of the fracture surface) after the fracture surface is formed is $V^i$, $\mu^{i+1}$ is the friction coefficient of the fracture surface when the X-axis loading rate (namely, the sliding rate of the fracture surface) after the fracture surface is formed is $V^{i+1}$; (a−b)<0 is a necessary condition that the fracture surface may produce unstable seismic sliding on fracture surface, the larger the value of the (a−b), the higher the stability of the fracture surface. The permeability k of the fracture surface in the sliding process can be calculated by using a formula $k=(-12\eta LQ/W\Delta P)^{2/3}/12$ according to a cubic law, where ΔP is a pressure difference (ΔP=0.4 MPa) between a pressure gauge reading and atmosphere pressure; η is the dynamic viscosity of the seepage fluid medium (carbon dioxide in the present embodiment); L is the length of a fracture contact surface in the sliding process (the sizes of the contact surfaces, in the X-axis direction, of an upper rock specimen and a lower rock specimen formed by shearing in the sliding process of the fracture surface, and can be determined according to the sliding displacement of the fracture surface); W is the width of the fracture surface (namely, the size of the fracture surface in the Y-axis direction); Q is the reading of the flowmeter.

What is claimed is:

1. A reciprocating rock fracture friction-seepage characteristic test device, comprising an X-axis shear system, a Y-axis stress loading system, a Z-axis stress loading system, and a servo oil source system, and further comprising a pore pressure loading system and a host (6), wherein the X-axis shear system comprises an X-axis EDC controller (10), an upper shear box (11), a lower shear box (12), an X-axis left hydraulic cylinder (13), an X-axis right hydraulic cylinder (14), an X-axis left pressure head (15), an X-axis right pressure head (16), an X-axis left pressure sensor (17), an X-axis right pressure sensor (18), and an X-axis displacement sensor; the servo oil source system supplies oil to the X-axis left hydraulic cylinder (13) and the X-axis right hydraulic cylinder (14); the lower shear box (12), the X-axis left hydraulic cylinder (13), and the X-axis right hydraulic cylinder (14) are separately fixedly mounted; the upper shear box (11) and the lower shear box (12) directly face each other and are parallel to each other to form a cavity that can accommodate a rock specimen (7); a left connecting hole is formed in the lower edge of the left side wall of the upper shear box (11) and the upper edge of the left side wall of the lower shear box (12) in a mode of forming gaps oppositely; a right connecting hole is formed in the lower edge of the right side wall of the upper shear box (11) and the upper edge of the right side wall of the lower shear box (12) in a mode of forming gaps oppositely; the end part of a piston rod of the X-axis left hydraulic cylinder (13) is fixedly connected to the X-axis left pressure head (15); the X-axis left pressure head (15) acts on the left side of the upper shear box (11); a left shear force is applied to the upper shear box (11) through the X-axis left pressure head (15); the X-axis left pressure sensor (17) is mounted at the position where the left shear force can be measured and is electrically connected to the X-axis EDC controller (10) through a signal line; the end part of the piston rod of the X-axis right hydraulic cylinder (14) is fixedly connected to the X-axis right pressure head (16); the X-axis right pressure head (16) acts on the right side of the upper shear box (11); a right shear force is applied to the upper shear box (11) through the X-axis right pressure head (16); the X-axis right pressure sensor (18) is mounted at the position where the right shear force can be measured and is electrically connected to the X-axis EDC controller (10) through a signal line; the X-axis displacement sensor is mounted at the position where fracture surface sliding displacement formed by shearing can be measured and is electrically connected to the X-axis EDC controller (10) through a signal line; the X-axis EDC controller (10) is electrically connected to the host (6), a directional valve (40) used for switching oil supply of the X-axis left hydraulic cylinder and the X-axis right hydraulic cylinder and an X-axis electro-hydraulic servo valve (41) used for regulating the oil flow of oil supply of the X-axis left hydraulic cylinder and the X-axis right hydraulic cylinder in the servo oil source system through signal lines;

the Y-axis stress loading system can load Y-axis stress on the upper shear box, the lower shear box, and the rock specimen; the Z-axis stress loading system can load Z-axis stress on the upper shear box, the lower shear box, and the rock specimen;

the pore pressure loading system comprises a gas cylinder (50), a pressure gauge (51), a pressure reducing valve (52), a fluid inlet pipeline (53), a fluid outlet pipeline (54), and a flowmeter (55); the pressure gauge (51) and the pressure reducing valve (52) are mounted on the fluid inlet pipeline (53); one end of the fluid inlet pipeline (53) is inserted into the right connecting hole and can be in contact with the rock specimen (7); the other end of the fluid inlet pipeline (53) is connected to the gas cylinder (50); the flowmeter (55) is mounted on the fluid outlet pipeline (54) and is electrically connected to the host (6) through a signal line; one end of the fluid outlet pipeline (54) is inserted into the left connecting hole and can be in contact with the rock specimen (7); the other end of the fluid outlet pipeline (54) is directly connected to the atmosphere.

2. The reciprocating rock fracture friction-seepage characteristic test device, according to claim 1, further comprising an acoustic emission detection system, wherein the acoustic emission detection system comprises an acoustic emission signal analyzer (80), an acoustic emission probe (81), and an acoustic reception probe (82); the acoustic emission probe (81) is mounted on the left side wall of the upper shear box (11) or the left side wall of the lower shear box (12) and is electrically connected to the acoustic emission signal analyzer (80) through a signal line; the acoustic reception probe (82) is mounted on the right side wall of the upper shear box (11) or the right side wall of the lower shear box (12) and is electrically connected to the acoustic emission signal analyzer (80) through a signal line; the acoustic emission signal analyzer (80) is electrically connected to the host (6) through a signal line.

3. The reciprocating rock fracture friction-seepage characteristic test device according to claim 2, wherein the Y-axis stress loading system comprises a Y-axis EDC controller (20), a Y-axis hydraulic cylinder (21), a Y-axis pressure head (22), a Y-axis pressure plate (23) corresponding to the Y-axis pressure head (22), a Y-axis pressure sensor (24), and a Y-axis loading frame; the Y-axis loading frame is a square-shaped frame formed by vertically connecting a front steel plate (25), a rear steel plate (26), a left steel plate (27), and a right steel plate (28); the servo oil source system supplies oil to the Y-axis hydraulic cylinder (21); the Y-axis hydraulic cylinder (21) is fixedly mounted on the front steel plate (25); the end part of a piston rod of the Y-axis hydraulic cylinder (21) is fixedly connected to the Y-axis pressure head (22); the Y-axis pressure plate (23) is fixedly mounted on the rear steel plate (26); the Y-axis pressure head (22) acts on the front sides of the upper shear box and the lower shear box; the Y-axis pressure plate (23) acts on the rear sides of the upper shear box and the lower shear box; Y-axis stress can be loaded to the upper shear box, the lower shear box, and the rock specimen through the coordination of the Y-axis pressure head (22) and the Y-axis pressure plate (23); the Y-axis pressure sensor (24) is mounted at the position where the Y-axis stress can be measured and is electrically connected to the Y-axis EDC controller (20) through a signal line; the Y-axis EDC controller (20) is electrically connected to the host (6), and a Y-axis electro-hydraulic servo valve (42) used for regulating the oil flow of oil supply of the Y-axis left hydraulic cylinder in the servo oil source system through signal lines.

4. The reciprocating rock fracture friction-seepage characteristic test device according to claim 3, wherein the Y-axis stress loading system further comprises a Y-axis displacement sensor (29); the Y-axis displacement sensor (29) is mounted at the position where the displacement of the Y-axis pressure head can be measured and is electrically connected to the Y-axis EDC controller (20) through a signal line.

5. The reciprocating rock fracture friction-seepage characteristic test device according to claim 4, wherein the X-axis left hydraulic cylinder (13) is fixedly mounted on the left steel plate (27); the X-axis right hydraulic cylinder (14) is fixedly mounted on the right steel plate (28).

6. The reciprocating rock fracture friction-seepage characteristic test device according to claim 5, wherein the Z-axis stress loading system comprises a Z-axis EDC controller (30), a Z-axis hydraulic cylinder (31), a Z-axis pressure head (32), a Z-axis pressure plate (33) corresponding to the Z-axis pressure head (32), a Z-axis pressure sensor (34), a Z-axis displacement sensor (35), a door-shaped frame (36), and a pressure chamber (37); the Z-axis pressure plate (33) is fixedly mounted at the bottom of the pressure chamber (37); the lower shear box (12) is fixedly mounted on the Z-axis pressure plate (33); the servo oil source system supplies oil to the Z-axis hydraulic cylinder (31); the Z-axis hydraulic cylinder (31) is suspended in the pressure chamber (37) through the door-shaped frame (36) mounted at the top of the pressure chamber; the Z-axis hydraulic cylinder (31) is provided with two piston rods; the Z-axis displacement sensor (35) is mounted at the end part of the upper piston rod (38) of the Z-axis hydraulic cylinder (31); the end part of the lower piston rod (39) of the Z-axis hydraulic cylinder (31) is fixedly connected to one end of the Z-axis pressure sensor (34); the other end of the Z-axis pressure sensor (34) is fixedly connected to the Z-axis pressure head (32); the Z-axis pressure head (32) acts on the upper side of the upper shear box; Z-axis stress can be loaded on the upper shear box, the lower shear box, and the rock specimen through the coordination of the Z-axis pressure head (32) and the Z-axis pressure plate (33); the Z-axis pressure sensor (34) and the Z-axis displacement sensor (35) are separately electrically connected to the Z-axis EDC controller (30) through signal lines; the Z-axis EDC controller (30) is electrically connected to the host (6) and a Z-axis electro-hydraulic servo valve (43) used for regulating the oil flow of oil supply of the Z-axis hydraulic cylinder in the servo oil source system through signal lines.

7. The reciprocating rock fracture friction-seepage characteristic test device according to claim 1, wherein the X-axis displacement sensor consists of an X-axis left displacement sensor (19) and an X-axis right displacement sensor (110); the X-axis left displacement sensor (19) is mounted on the X-axis left pressure head (15) and is electrically connected to the X-axis EDC controller (10) through a signal line; the X-axis right displacement sensor (110) is mounted on the X-axis right pressure head (16) and is electrically connected to the X-axis EDC controller (10) through a signal line.

8. The reciprocating rock fracture friction-seepage characteristic test device according to claim 7, wherein the Y-axis stress loading system comprises a Y-axis EDC controller (20), a Y-axis hydraulic cylinder (21), a Y-axis pressure head (22), a Y-axis pressure plate (23) corresponding to the Y-axis pressure head (22), a Y-axis pressure sensor (24), and a Y-axis loading frame; the Y-axis loading frame is a square-shaped frame formed by vertically connecting a front steel plate (25), a rear steel plate (26), a left steel plate (27), and a right steel plate (28); the servo oil source system supplies oil to the Y-axis hydraulic cylinder (21); the Y-axis hydraulic cylinder (21) is fixedly mounted on the front steel plate (25); the end part of a piston rod of the Y-axis hydraulic cylinder (21) is fixedly connected to the Y-axis pressure head (22); the Y-axis pressure plate (23) is fixedly mounted on the rear steel plate (26); the Y-axis pressure head (22) acts on the front sides of the upper shear box and the lower shear box; the Y-axis pressure plate (23) acts on the rear sides of the upper shear box and the lower shear box; Y-axis stress can be loaded to the upper shear box, the lower shear box, and the rock specimen through the coordination of the Y-axis pressure head (22) and the Y-axis pressure plate (23); the Y-axis pressure sensor (24) is mounted at the position where the Y-axis stress can be measured and is electrically connected to the Y-axis EDC controller (20) through a signal line; the Y-axis EDC controller (20) is electrically connected to the host (6), and a Y-axis electro-hydraulic servo valve (42) used for regulating the oil flow of oil supply of the Y-axis left hydraulic cylinder in the servo oil source system through signal lines.

9. The reciprocating rock fracture friction-seepage characteristic test device according to claim 8, wherein the Y-axis stress loading system further comprises a Y-axis displacement sensor (29); the Y-axis displacement sensor (29) is mounted at the position where the displacement of the Y-axis pressure head can be measured and is electrically connected to the Y-axis EDC controller (20) through a signal line.

10. The reciprocating rock fracture friction-seepage characteristic test device according to claim 9, wherein the X-axis left hydraulic cylinder (13) is fixedly mounted on the left steel plate (27); the X-axis right hydraulic cylinder (14) is fixedly mounted on the right steel plate (28).

11. The reciprocating rock fracture friction-seepage characteristic test device according to claim 10, wherein the Z-axis stress loading system comprises a Z-axis EDC controller (30), a Z-axis hydraulic cylinder (31), a Z-axis pressure head (32), a Z-axis pressure plate (33) corresponding to the Z-axis pressure head (32), a Z-axis pressure sensor (34), a Z-axis displacement sensor (35), a door-shaped frame (36), and a pressure chamber (37); the Z-axis pressure plate (33) is fixedly mounted at the bottom of the pressure chamber (37); the lower shear box (12) is fixedly mounted on the Z-axis pressure plate (33); the servo oil source system supplies oil to the Z-axis hydraulic cylinder (31); the Z-axis hydraulic cylinder (31) is suspended in the pressure chamber (37) through the door-shaped frame (36) mounted at the top of the pressure chamber; the Z-axis hydraulic cylinder (31) is provided with two piston rods; the Z-axis displacement sensor (35) is mounted at the end part of the upper piston rod (38) of the Z-axis hydraulic cylinder (31); the end part of the lower piston rod (39) of the Z-axis hydraulic cylinder (31) is fixedly connected to one end of the Z-axis pressure sensor (34); the other end of the Z-axis pressure sensor (34) is fixedly connected to the Z-axis pressure head (32); the Z-axis pressure head (32) acts on the upper side of the upper shear box; Z-axis stress can be loaded on the upper shear box, the lower shear box, and the rock specimen through the coordination of the Z-axis pressure head (32) and the Z-axis pressure plate (33); the Z-axis pressure sensor (34) and the Z-axis displacement sensor (35) are separately electrically connected to the Z-axis EDC controller (30) through signal lines; the Z-axis EDC controller (30) is electrically connected to the host (6) and a Z-axis electro-hydraulic servo valve (43) used for regulating the oil flow of oil supply of the Z-axis hydraulic cylinder in the servo oil source system through signal lines.

12. The reciprocating rock fracture friction-seepage characteristic test device according to claim 1, wherein the inner surface of the upper shear box (11) is coated with a sealing rubber layer that can fill the gap between the upper shear box (11) and the rock specimen (7); the inner surface of the lower shear box (12) is also coated with a sealing rubber layer that can fill the gap between the lower shear box (12) and the rock specimen (7); the upper shear box (11) and the lower shear box (12) are sealed by a sealing strip.

13. The reciprocating rock fracture friction-seepage characteristic test device according to claim 12, wherein the Y-axis stress loading system comprises a Y-axis EDC controller (20), a Y-axis hydraulic cylinder (21), a Y-axis pressure head (22), a Y-axis pressure plate (23) corresponding to the Y-axis pressure head (22), a Y-axis pressure sensor (24), and a Y-axis loading frame; the Y-axis loading frame is a square-shaped frame formed by vertically connecting a front steel plate (25), a rear steel plate (26), a left steel plate (27), and a right steel plate (28); the servo oil source system supplies oil to the Y-axis hydraulic cylinder (21); the Y-axis hydraulic cylinder (21) is fixedly mounted on the front steel plate (25); the end part of a piston rod of the Y-axis hydraulic cylinder (21) is fixedly connected to the Y-axis pressure head (22); the Y-axis pressure plate (23) is fixedly mounted on the rear steel plate (26); the Y-axis pressure head (22) acts on the front sides of the upper shear box and the lower shear box; the Y-axis pressure plate (23) acts on the rear sides of the upper shear box and the lower shear box; Y-axis stress can be loaded to the upper shear box, the lower shear box, and the rock specimen through the coordination of the Y-axis pressure head (22) and the Y-axis pressure plate (23); the Y-axis pressure sensor (24) is mounted at the position where the Y-axis stress can be measured and is electrically connected to the Y-axis EDC controller (20) through a signal line; the Y-axis EDC controller (20) is electrically connected to the host (6), and a Y-axis electro-hydraulic servo valve (42) used for regulating the oil flow of oil supply of the Y-axis left hydraulic cylinder in the servo oil source system through signal lines.

14. The reciprocating rock fracture friction-seepage characteristic test device according to claim 13, wherein the Y-axis stress loading system further comprises a Y-axis displacement sensor (29); the Y-axis displacement sensor (29) is mounted at the position where the displacement of the Y-axis pressure head can be measured and is electrically connected to the Y-axis EDC controller (20) through a signal line.

15. The reciprocating rock fracture friction-seepage characteristic test device according to claim 14, wherein the X-axis left hydraulic cylinder (13) is fixedly mounted on the left steel plate (27); the X-axis right hydraulic cylinder (14) is fixedly mounted on the right steel plate (28).

16. The reciprocating rock fracture friction-seepage characteristic test device according to claim 1, wherein the Y-axis stress loading system comprises a Y-axis EDC controller (20), a Y-axis hydraulic cylinder (21), a Y-axis pressure head (22), a Y-axis pressure plate (23) corresponding to the Y-axis pressure head (22), a Y-axis pressure sensor (24), and a Y-axis loading frame; the Y-axis loading frame is a square-shaped frame formed by vertically connecting a front steel plate (25), a rear steel plate (26), a left steel plate (27), and a right steel plate (28); the servo oil source system supplies oil to the Y-axis hydraulic cylinder (21); the Y-axis hydraulic cylinder (21) is fixedly mounted on the front steel plate (25); the end part of a piston rod of the Y-axis hydraulic cylinder (21) is fixedly connected to the Y-axis pressure head (22); the Y-axis pressure plate (23) is fixedly mounted on the rear steel plate (26); the Y-axis pressure head (22) acts on the front sides of the upper shear box and the lower shear box; the Y-axis pressure plate (23) acts on the rear sides of the upper shear box and the lower shear box; Y-axis stress can be loaded to the upper shear box, the lower shear box, and the rock specimen through the coordination of the Y-axis pressure head (22) and the Y-axis pressure plate (23); the Y-axis pressure sensor (24) is mounted at the position where the Y-axis stress can be measured and is electrically connected to the Y-axis EDC controller (20) through a signal line; the Y-axis EDC controller (20) is electrically connected to the host (6), and a Y-axis electro-hydraulic servo valve (42) used for regulating the oil flow of oil supply of the Y-axis left hydraulic cylinder in the servo oil source system through signal lines.

17. The reciprocating rock fracture friction-seepage characteristic test device according to claim 16, wherein the Y-axis stress loading system further comprises a Y-axis displacement sensor (29); the Y-axis displacement sensor (29) is mounted at the position where the displacement of the Y-axis pressure head can be measured and is electrically connected to the Y-axis EDC controller (20) through a signal line.

18. The reciprocating rock fracture friction-seepage characteristic test device according to claim 17, wherein the X-axis left hydraulic cylinder (13) is fixedly mounted on the left steel plate (27); the X-axis right hydraulic cylinder (14) is fixedly mounted on the right steel plate (28).

19. The reciprocating rock fracture friction-seepage characteristic test device according to claim 18, wherein the Z-axis stress loading system comprises a Z-axis EDC controller (30), a Z-axis hydraulic cylinder (31), a Z-axis pressure head (32), a Z-axis pressure plate (33) corresponding to the Z-axis pressure head (32), a Z-axis pressure sensor (34), a Z-axis displacement sensor (35), a door-shaped frame (36), and a pressure chamber (37); the Z-axis pressure plate (33) is fixedly mounted at the bottom of the pressure chamber (37); the lower shear box (12) is fixedly mounted on the Z-axis pressure plate (33); the servo oil source system supplies oil to the Z-axis hydraulic cylinder (31); the Z-axis hydraulic cylinder (31) is suspended in the pressure chamber (37) through the door-shaped frame (36) mounted at the top of the pressure chamber; the Z-axis hydraulic cylinder (31) is provided with two piston rods; the Z-axis displacement sensor (35) is mounted at the end part of the upper piston rod (38) of the Z-axis hydraulic cylinder (31); the end part of the lower piston rod (39) of the Z-axis hydraulic cylinder (31) is fixedly connected to one end of the Z-axis pressure sensor (34); the other end of the Z-axis pressure sensor (34) is fixedly connected to the Z-axis pressure head (32); the Z-axis pressure head (32) acts on the upper side of the upper shear box; Z-axis stress can be loaded on the upper shear box, the lower shear box, and the rock specimen through the coordination of the Z-axis pressure head (32) and the Z-axis pressure plate (33); the Z-axis pressure sensor (34) and the Z-axis displacement sensor (35) are separately electrically connected to the Z-axis EDC controller (30) through signal lines; the Z-axis EDC controller (30) is electrically connected to the host (6) and a Z-axis electro-hydraulic servo valve (43) used for regulating the oil flow of oil supply of the Z-axis hydraulic cylinder in the servo oil source system through signal lines.

20. A reciprocating rock fracture friction-seepage characteristic test method, using the test device according to claim 1, and comprising:
step one, preparing the rock specimen (7), and uniformly coating the outer surface of the rock specimen with a layer of polyurethane sealing rubber;
step two, placing the rock specimen (7) which is coated with the layer of polyurethane sealing rubber into the lower shear box (12), injecting polyurethane sealing rubber that can fill a gap between the lower shear box (12) and the rock specimen (7) into the gap, then covering lower shear box (12) with the upper shear box (11), and injecting polyurethane sealing rubber that can fill a gap between the upper shear box (11) and the rock specimen (7) into the gap;
step three, fixedly mounting the lower shear box (12) on the Z-axis pressure plate (33), so that the Y-axis pressure plate (23) is in contact with the rear sides of the upper shear box and the lower shear box, and the Y-axis pressure head (22) is in contact with the front sides of the upper shear box and the lower shear box, the Z-axis pressure head (32) is in contact with the upper side of the upper shear box, the X-axis left pressure head (15) is in contact with the left side of the upper shear box (11), and the X-axis right pressure head (16) is in contact with the right side of the upper shear box (11);
step four, inserting one end of the fluid inlet pipeline (53) in the pore pressure loading system into the right connecting hole to be in contact with the rock specimen (7); inserting one end of the fluid outlet pipeline (54) into the left connecting hole to be in contact with the rock specimen (7);
step five, performing vacuuming on pipelines in various systems of the test device;
step six, mounting an acoustic emission probe (81) and an acoustic reception probe (82);
step seven, loading Z-axis stress and Y-axis stress on the upper shear box, the lower shear box, and the rock specimen therein;
step eight, loading pore pressure in a mode of introducing a seepage fluid medium into the fluid inlet pipeline (53);
step nine, applying a left shear force or a right shear force to the upper shear box and the rock specimen therein at a first preset X-axis loading rate, wherein when the left shear force or right shear force to be loaded increases, decreases, and then remains stable, it means that the shearing is completed to form the fracture surface (71); continuously loading the upper shear force or the right shear force at a first preset X-axis loading rate, wherein the fracture surface starts sliding, the X-axis loading rate and the X-axis loading direction can be changed according to experimental needs in a sliding process of the fracture surface, and the reciprocating loading is performed in a mode of changing the X-axis loading direction;
step ten, calculating to obtain a fracture surface friction coefficient $\mu$ by using a formula $\mu=\tau/\sigma$; calculating to obtain a stability parameter (a−b) of a fracture surface by using a formula $(a-b)=(\mu^{i+1}-\mu^i)/\ln(V^{i+1}/V^i)$; calculating to obtain the permeability k of the fracture surface in a sliding process by using a formula $k=(-12\eta LQ/W\Delta P)^{2/3}/12$, wherein $\tau$ is an X-axis shear force, and $\tau$ equals to the left shear force or the right shear force, $\sigma$ is the Z-axis stress; $\mu^i$ is the friction coefficient of the fracture surface when the X-axis loading rate is $V^i$ after the fracture surface is formed; $\mu^{i+1}$ is the friction coefficient of the fracture surface when the X-axis loading rate is $V^{i+1}$ after the fracture surface is formed; $\Delta P$ is a pressure difference between a pressure gauge reading and atmosphere pressure; $\eta$ is the dynamic viscosity of the seepage fluid medium; L is the length of a fracture contact surface in the sliding process; W is the width of the fracture surface; Q is the reading of the flowmeter.

\* \* \* \* \*